United States Patent [19]

Doyle, Jr.

[11] Patent Number: 4,816,848
[45] Date of Patent: Mar. 28, 1989

[54] IMAGE BEARING TEMPLATE FOR INSTANT FILM PACKS

[75] Inventor: Edward J. Doyle, Jr., Plympton, Mass.

[73] Assignee: Polaroid Corporation, Cambridge, Mass.

[21] Appl. No.: 198,510

[22] Filed: May 25, 1988

[51] Int. Cl.$^4$ .................. G03B 17/24; G03B 17/52
[52] U.S. Cl. .................................. 354/108; 354/276; 354/295
[58] Field of Search ............... 354/105, 106, 107, 108, 354/125, 295, 296, 276; 355/39, 40

[56] References Cited

U.S. PATENT DOCUMENTS

| | | | |
|---|---|---|---|
| 3,916,423 | 10/1975 | Ueda et al. | 354/108 |
| 4,268,144 | 5/1981 | Wheeler | 354/108 |
| 4,304,471 | 12/1981 | Jones | 354/108 |
| 4,655,570 | 4/1987 | Jaffe | 354/107 |

Primary Examiner—A. A. Mathews
Attorney, Agent, or Firm—David R. Thornton

[57] ABSTRACT

An image bearing template adapted for use with an exposure window of an instant film pack and being made up of a thin sheet and a pair of rigid strips. The thin sheet has a lateral dimension substantially the same as or less than the width of the exposure window, and a longitudinal dimension greater than the length of the exposure window. Each of the rigid strips has a length equal to or slightly less than the lateral dimensions of the window and extends laterally across the sheet so that upon insertion of the template within the film pack, the strips preclude movement of the template and stiffen the template so as to keep the sheet flat. The strips also serve to facilitate insertion and removal of the template by providing upstanding edges for grasping.

5 Claims, 2 Drawing Sheets

IMAGE BEARING TEMPLATE FOR INSTANT FILM PACKS

BACKGROUND OF THE INVENTION

The present invention relates to image bearing templates for masking or otherwise modifying the light image to which photographic film is exposed in a camera, and more particularly, it concerns such templates adapted to be used with instant film packs.

The current state-of-the-art relative to information or image bearing templates of the general class which includes the present invention are exemplified by the disclosures of U.S. Pat. Nos. 3,916,423—Ueda et al and 4,268,144—Wheeler. In both of these patents, a substantially transparent template or mask having light blocking information or images thereon are adapted to be inserted in the exposure window of commercially available instant film packs in which each of a succession of individual film units supplied in the pack are advanced to the camera focal plane as established by the top wall of the pack housing in which the exposure window is formed.

In the Ueda et al patent, the template or mask is formed by a relatively thick and rigid plate of glass or similar material. In one form, the rigid template of Ueda et al is a rectangular body dimensioned the same as the exposure window with four outwardly directed projections on the side edges intended to stress the material of the film pack housing forming the exposure window to hold the template in place. In another form of the rigid template of Ueda et al, insertability of the rigid plate into the film pack window is enabled by forming the major body of the plate with peripheral dimensions somewhat smaller than the film pack window so that tabs projecting from opposite sides of the plate can be inserted through the window and will underlie the wall of the pack housing in which the window is formed. The thickness of the plate causes diffraction of the subject image and results in displacement of the objective focal plane from the surface of the uppermost film unit in the pack. Sharpness of the subject image can be accommodated by a combination of restricting the thickness of the tabs holding the plate in the window and selecting the index of refraction of the material from which the plate is formed to correct for displacement of the objective focal plane from the surface of the uppermost film unit.

The Wheeler patent employs a relatively thin and pliant template having projecting tabs extending from three sides and adapted to underlie the pack wall in which the exposure window is formed. To retain the template against movement in one direction with an underlying film unit as the latter is ejected from the pack housing for processing after exposure, the leading edge of the template is formed with a central, generally up-struck limit tab. To otherwise orient the template in relation to the exposure window Wheeler relies on edge portions of the thin sheet which, of necessity, fit within the pack with clearance space between the template edges and the side walls of the film pack. Also, insertion and removal of the Wheeler template requires manipulation at the image surface of the template.

In light of the prior art, there exists a need for a thin image bearing template which does not distort or rely upon the resiliency of the exposure window frame in a film pack for retention or insertion of the template, which insures both longitudinal and lateral positioning support of the template in the exposure window and which facilitates insertion and removal of the template without excessive manual contact with the image surface of the template.

SUMMARY OF THE INVENTION

In accordance with the present invention, an image bearing template is provided for use with film packs, which facilitate insertion and removal of the template, assures accurate positioning of the template in relation to the exposure window of such film packs, and which results in minimal displacement of the exposure surface of a film unit from the focal plane in which it is normally presented.

The image bearing template of the invention is embodied in a thin pliable sheet having a lateral dimension equal to or less than the width of the exposure window in which it is used and a longitudinal dimension greater than the length of such an exposure window. A pair of raised edge portions, in the form of L-shaped strips of a length substantially equal to the width of the window are attached across the upper surface of the pliable sheet at locations corresponding to the front and rear edges of the exposure window. These raised edge portions operatively locate and maintain the position of the template within the exposure window of the film pack housing. Further, the raised edge portions aid in the insertion and removal of the template and help to keep the image surface of the template free from fingerprints. Moreover, the raised edge portions provide an increment of rigidity to the template to keep the template flush with an image receiving surface of each successive film unit.

A principal object of the invention, therefore, is the provision of a thin, pliable image bearing template for use with instant film packs and having a pair of relatively rigid members which maintain proper positioning of the image portion of the template relative to the image receiving surface of successive film units.

Another object of the present invention is the provision of such an image bearing, thin and pliable template having a pair of upstanding members which facilitate insertion and removal of the template.

Still another object of the present invention is the provision of an image bearing template having edge strips which provide rigidity to the template and allow for the use of very thin films as the image bearing portion.

Other objects and further scope of applicability of the present invention will become apparent from the detailed description to follow taken in conjunction with the accompanying drawings in which like parts are designated by like reference characters.

DETAILED DESCRIPTION OF THE PREFERRED EMBODIMENTS

Figure 1:
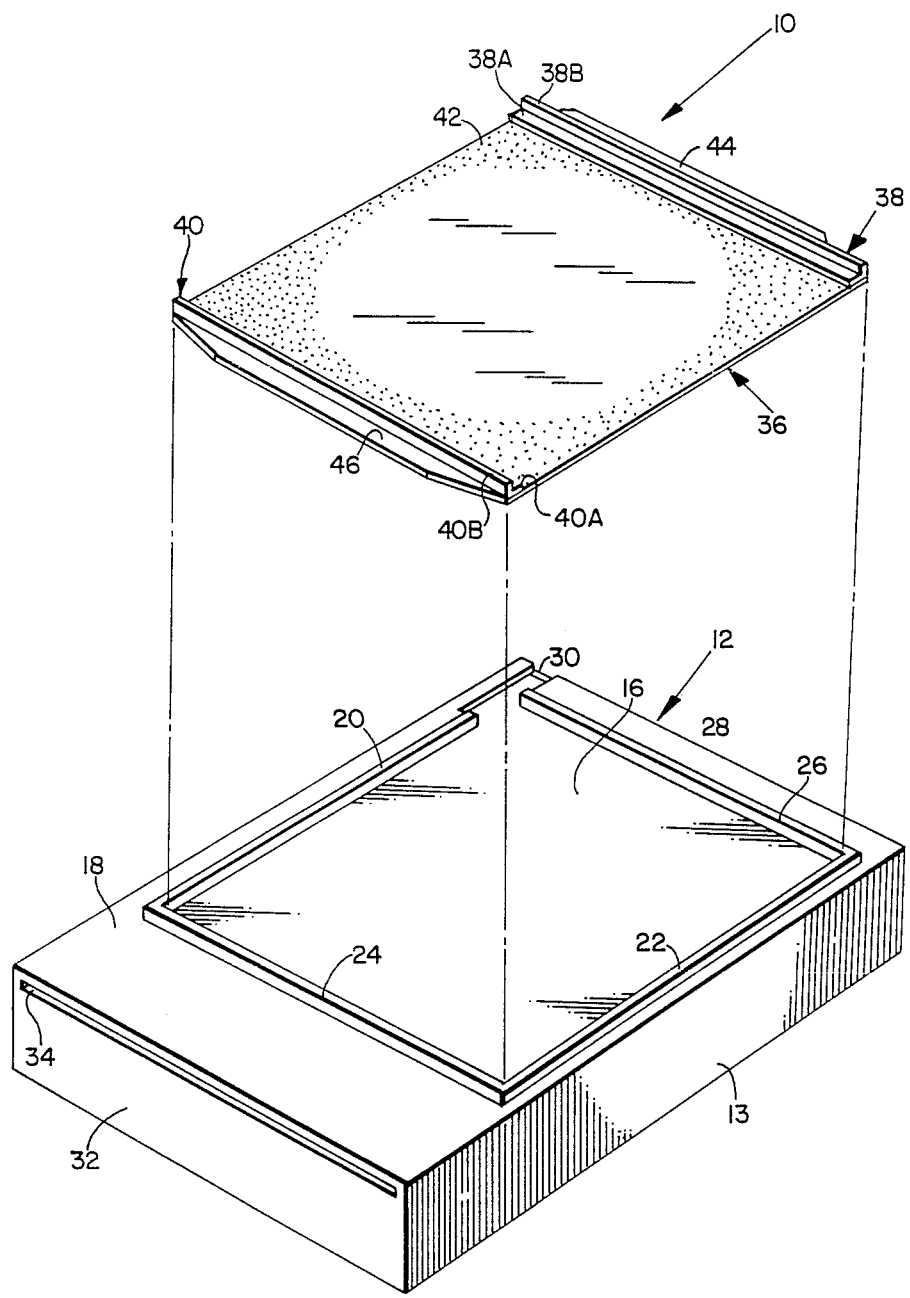
FIG. 1 is an exploded perspective view illustrating the image bearing template of the present invention together with a conventional film pack.
Figure 2:
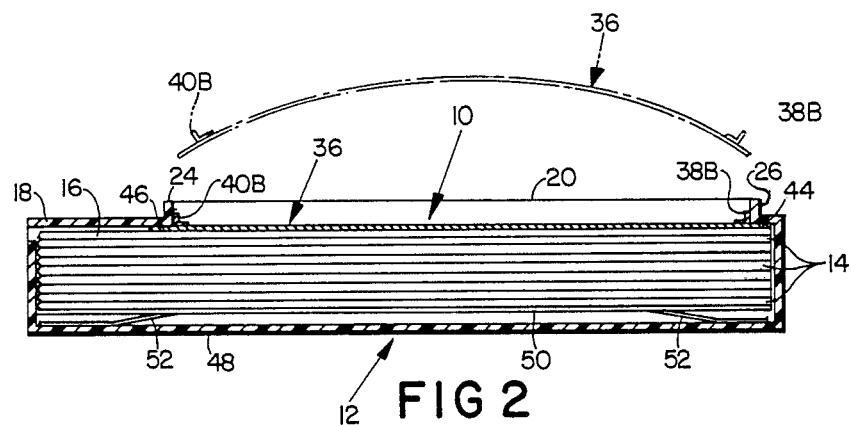
FIG. 2 is a cross-section representation of the image bearing template of FIG. 1 in an operative position within the film pack; and, FIG. 3 is a fragmentary cross-section similar to FIG. 2 but illustrating the pattern of light incident upon the image bearing template of the invention during an exposure.

In FIG. 1 of the drawings, an image bearing template in accordance with one embodiment of the present invention is generally designated by the reference numeral 10 and for the sake of clarity is shown in a position above a conventional film pack generally designated by the reference numeral 12. The film pack 12 is of a conventional design and includes a film pack housing 13 having a parallelepiped configuration adapted to hold a plurality of instant picture film units 14 and an overlying dark slide 16 (FIGS. 1 and 2). A top wall 18 of the film pack housing includes four upstanding frame elements, two lateral frame elements 20, 22 and two longitudinal frame elements 24, 26, defining therebetween an exposure window 28. The frame elements 20 and 26 are cut short and the top wall 18 has a cutout 30 in order to accommodate a film unit pick or ejector (not shown) of a self developing type camera. Further, the film pack housing 13 includes a front wall 32 having an ejection opening 34 which allows for sequential ejection of first, the dark slide 16 and then film units 14, one at a time, after exposure of each of the film units.

As shown in FIG. 1, the image bearing template 10 of the present invention is made up of a thin, pliable image bearing sheet or film 36 and a pair of relatively rigid strips or members 38 and 40. The sheet 36 may be, for example, a sheet of transparent or translucent polyethylene, polyester or acetate. The sheet 36 has an image bearing portion 42 bounded by the members 38 and 40 and carrying, for example, an opaque or colored image. The longitudinal ends of the sheet 36 form a pair of tabs 44 and 46 located outwardly of the members 38 and 40, respectively.

In FIG. 1, it will be noted that both the width of the thin sheet 36 and the length of each of the rigid members 38 and 40 are just equal to or slightly less than the lateral dimension of the exposure window 28 defined by the lateral frame elements 20 and 22. The length of the sheet 36 is greater than the longitudinal dimension of the exposure window 28 defined by the longitudinal frame elements 24 and 26. This excess length is divided into two relatively equal portions which make up the tabs 44 and 46.

Figure 3:
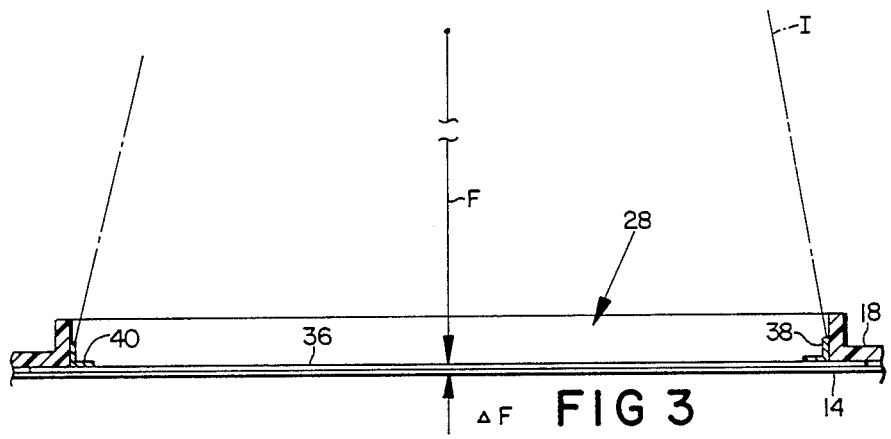

In accordance with the embodiment shown in FIGS. 1–3, each of the rigid members 38 and 40 have an L-shaped cross-section and are attached to the sheet 36 in opposite orientations. It is to be understood that the rigid members 38 and 40 may be formed, for example, of transparent, translucent, opaque or colored plastic materials. Each of the members 38 and 40 includes a horizontal portion 38A and 40A, respectively, which provides a planar surface facilitating attachment to the sheet 36. The horizontal portions 38A and 40A may, for example, be attached to the sheet 36 by an adhesive. Each of the members 38 and 40 also includes a vertical portion 38B and 40B, respectively, which serves not only to properly position the image bearing portion 42 within the exposure window 28 and to preclude movement of the template while in an operative position, but also to facilitate insertion and removal of the template 10.

As shown in solid lines in FIG. 2 of the drawings, the rigid members 38 and 40 are attached to the thin sheet 36 at locations which ensure that portions of an outer surface of each of the vertical portions 38B and 40B will abut the longitudinal frame members 26 and 24, respectively, when the image bearing template 10 is in the position shown. As a result, the image portion 42 of the template 10 is located and maintained in a fixed orientation relative to the longitudinal dimension of the exposure window 28. In addition, both of the members 38 and 40 have a length or ends spaced a length equal to or slightly less than the lateral dimension of the exposure window 28 so that the ends of the members 38 and 40 abut with the respective frame elements 20 and 22 to provide support against lateral movement or shifting of the template once it is placed in position within the exposure window 28. Thus, the template 10 is also maintained in a fixed position relative to the lateral dimension of the exposure window 28. When the dark slide and each of the film units in the film pack are sequentially ejected, the resulting forces acting on the template 10 merely ensure that the vertical portion 40B of the member 40 is abutted squarely against the frame element 24. In this manner, the members 38 and 40 serve to fix the image portion 42 of the template 10 both laterally and longitudinally with respect to the exposure window 28.

Positioned between a bottom wall 48 of the film pack housing 13 and the lowermost film unit 14 is a spring 50 having a pair of spring biasing portions 52. The spring 50 forces the dark slide 16 up against the lower surface of the top wall 18 before insertion of the image bearing template 10 and against the lower surface of the sheet 36 after insertion of the template 10. In this way, when the template is in the operative position shown in solid lines in FIG. 2, the force provided by the spring 50 keeps the upper surface of each of the tabs 44 and 46 in contact with the lower surface of the top wall 18. Thus, once the template 10 has been inserted in the film pack 12, the tabs 44 and 46 and the rigid members 38 and 40 lock the template in a relatively fixed operative position.

As shown in phantom lines in FIG. 2, insertion of the present template 10 first requires that the sheet 36 be flexed or bowed about an imaginary axis perpendicular to its length so that it will fit through the exposure window 28. Such flexure of the sheet 36 may be accomplished by grasping or engaging the vertical portions 38B and 40B of the rigid members 38 and 40 between the thumb and forefinger of one hand to force the members 38 and 40 toward one another. Then, the tabs 44 and 46 are slipped between the dark slide 16 and the top wall 18 as the sheet 36 is allowed to return to its planar condition to assume the operative position shown in solid lines in FIG. 2. In this manner, insertion is accomplished without touching the image portion 42 of the sheet 36. The template may be removed by simultaneously pressing down on and forcing each of the portions 38B and 40B toward one another, thereby bowing the sheet 36, and then lifting the template away from the film pack housing 13. Thus, the rigid members 38 and 40 not only facilitate insertion and removal of the template 10, but also keep the sheet 36 free from undesirable fingerprints.

After the template 10 has been inserted into a film pack 12 as shown in solid lines in FIG. 2, the film pack is loaded into a self-developing camera (not shown) in a known and conventional manner. The camera includes a pick or hook element (not shown) which moves into the cutout 30 (FIG. 1) in the top wall 18 and forces a leading portion of the dark slide 16 to protrude through the ejection slot 34 in the front wall 32. The leading edge of the dark slide 16 protrudes far enough from the housing 13 to be grasped between a pair of driven rollers (not shown) which pull the dark slide from the housing and eject it from the camera. In like fashion, each successive exposed film unit is ejected from the film pack and camera.

In FIG. 3, the template 10 is illustrated as inserted into the film pack 12, with the film pack loaded in a camera, the dark slide 16 ejected, and a film unit 14 undergoing exposure to illumination I during an exposure cycle. The upper or image-receiving surface of the film unit 14 is in direct contact with the lower surface of the sheet 36.

It should be understood that the thickness ΔF of the sheet 36 should be minimized to reduce the displacement of the image-receiving surface of the uppermost film unit 14 from the focal plane of the camera (not shown) within which the film pack 12 has been loaded. The focal length F of the camera defines a focal plane which coincides with the lower surface of the top wall 18 of the film pack housing 13. The thickness ΔF of the sheet 36 should be minimized to not only minimize the displacement of the image-receiving surface of each successive film unit from the focal plane, but also to lessen the diffusion of a subject image due to refraction by the sheet 36.

With reference again to FIG. 1 of the drawings, it will be noted that the rigid members 38 and 40 are attached across the entire width of the thin sheet 36. Hence, the members 38 and 40 stiffen, or that is, provide added rigidity to the template so as to keep the image portion 42 of the sheet 36 flat against each successive film unit during use while permitting the sheet 36 to be formed of a very thin material. In practice, it has been possible to use a sheet material having a thickness of only 3/1000 of an inch.

Furthermore, if the image on the image bearing portion 42 of the template 10 is on the upper surface of the sheet 36 (i.e., to reduce contact of it with the film surface), one needs to minimize the thickness of the sheet 36 to reduce diffusion of the template image. As shown in FIG. 1 of the drawings, the image may be, for example, a circular border pattern or vignette such as would be used in combination with a positive vignetting camera. It should be understood, however, that a wide variety of images, masks, colors or patterns may be applied to or constitute the image bearing portion 42.

While the preferred embodiment of the present invention has been shown in FIGS. 1–3, other embodiments may be formed by using rigid members or strips having, for example, rectangular, circular, or oval cross-sections instead of L-shaped cross-sections. Depending upon the border of the template image-bearing portion 42 underlying the members 38 and 40, the latter may be transparent or colored, including opaque. For example, with black underlying image areas, or if the underlying portions are not directly viewable in the final product, the color or transparency of the members is not important; however, in some other circumstances, transparent members may be desirable. It should also be understood that the members 38 and 40 are elongated to extend across the template to minimize assembly of them to the template sheet 36, to maximize its alignment in the pack and to provide simple insertion and removal from the film pack; however, mounting three and preferably four corner portions only of the members will provide reasonable alignment in the film pack. As illustrated, the members 38 and 40 and tabs 44 and 46 are provided at opposed ends of the length of the sheet 36; however, it should be understood that they could alternately be provided along the other opposed edges. Although not preferred, it is contemplated that the entire template, including the sheet and rigid members, may be molded as a singular integral unit.

Thus, it will be appreciated that as a result of the present invention, a thin image-bearing template is provided by which the principal objective, among others, is completely fulfilled. It is contemplated and will be apparent to those skilled in the art from the preceding description and accompanying drawings, that modifications and/or changes may be made in the illustrated embodiments without departure from the present invention. Accordingly, it is expressly intended that the foregoing description and accompanying drawings are illustrative of preferred embodiments only, not limiting, and that the true spirit and scope of the present invention be determined by reference to the appended claims.

What is claimed is:

1. An image bearing template for use with a film pack including a film pack housing and a plurality of film units, the film pack housing having an exposure window with fixed dimensions of width and length, the improvement comprising:

a thin sheet having a first dimension substantially the same as or less than one dimension of the exposure window and a second dimension greater than the other dimension of the exposure window; and a pair of relatively rigid members attached to and extending laterally across said sheet in a direction defining the first dimension thereof and parallel to and near the opposed edges defining the second dimension thereof so as to provide tab portions of said sheet extending thereat, each said member having a length substantially equal to or slightly less than the one dimension of the exposure window and affixed near said opposed edges such that the distance between the outer longitudinal edges of said members is substantially the same as or just less than the other dimension of the exposure window.

2. The template of claim 1, wherein each of the members includes an upstanding edge.

3. The template of claim 1, wherein each of said members is located a sufficient distance away from said opposed edges of said sheet to fit within the exposure window upon insertion of the template in the film pack housing.

4. The template of claim 1, wherein said sheet is formed of a transparent pliable material.

5. The template of claim 4 wherein each of said members is L-shaped in cross-section.

* * * * *